Sept. 19, 1950      J. W. GOODERHAM      2,522,946
ELECTRICAL CONTROL CIRCUIT FOR
ACCOUNTING SYSTEM DEVICES
Filed July 15, 1948      11 Sheets-Sheet 1
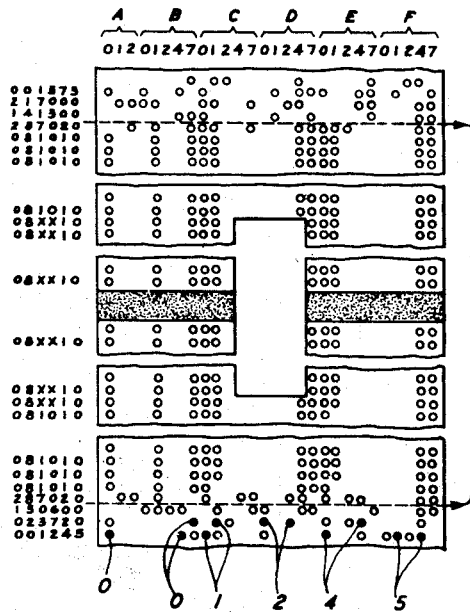
FIG. 1
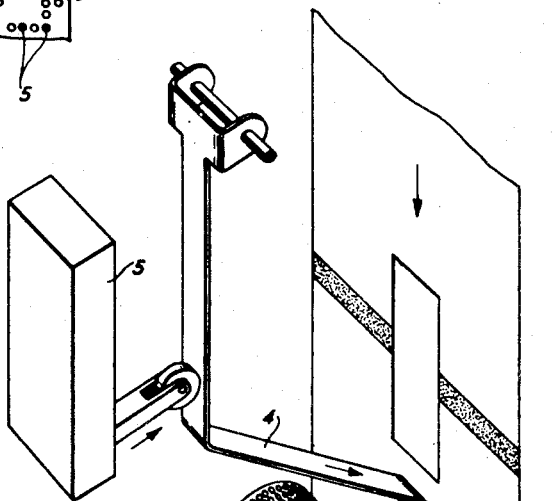
FIG. 2
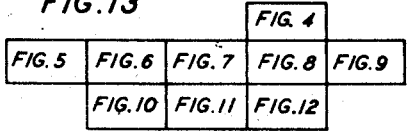
FIG. 13
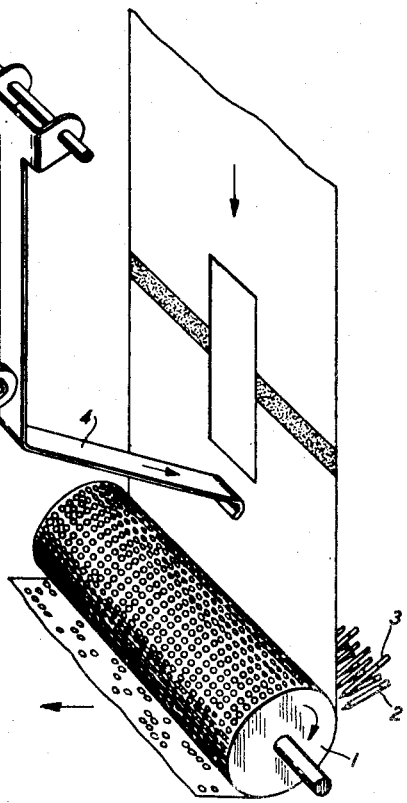
INVENTOR
J. W. GOODERHAM
BY
ATTORNEY Sept. 19, 1950 J. W. GOODERHAM 2,522,946
ELECTRICAL CONTROL CIRCUIT FOR
ACCOUNTING SYSTEM DEVICES
Filed July 15, 1948 11 Sheets-Sheet 5

INVENTOR
J. W. GOODERHAM
BY John A. Hall
ATTORNEY

Sept. 19, 1950     J. W. GOODERHAM     2,522,946
ELECTRICAL CONTROL CIRCUIT FOR
ACCOUNTING SYSTEM DEVICES Filed July 15, 1948     11 Sheets-Sheet 7

INVENTOR
J.W. GOODERHAM
BY
ATTORNEY

Patented Sept. 19, 1950

2,522,946

UNITED STATES PATENT OFFICE 2,522,946

ELECTRICAL CONTROL CIRCUIT FOR ACCOUNTING SYSTEM DEVICES

John W. Gooderham, Rye, N. Y., assignor to Bell Telephone Laboratories, Incorporated, New York, N. Y., a corporation of New York Application July 15, 1948, Serial No. 38,927

4 Claims. (Cl. 235—61.7)

This invention relates to automatic accounting systems and particularly to control means for electrical accounting devices of the type wherein information in coded form is read from and recorded on tapes.

The object of the invention is to provide means to enable the readers of the devices to ride over splices made in the tapes.

The accounting system employs electrically operated devices to assemble, sort, translate, compute and to otherwise rearrange items of information perforated in code on a tape. The first tape in a series of such tapes used is one which is automatically prepared by and through customer uses of given facilities over variable time periods and the items of information are in scattered form, occurring in the order of time at which the occurrence took place and became thereupon recorded. The items of information are mainly of three forms, first, items of specific information pertaining to individual customer uses of the given facilities, second, items of general or common information common to a plurality of customer uses and third, items of information pertaining purely to the state of an accounting device and of use in the control thereof. The system is based on the use of continuous tapes. The output tape of one device becomes the input tape for the next. In most cases the information contained in a single input tape is processed by a device and as a result thereof a plurality of output tapes are formed and these are physically spliced together to form a new single tape for the input of the next device.

Neither the reader nor the perforators of a device are adapted to operate through more than a single thickness of tape and hence means must be provided for causing the devices, particularly the readers, from stalling or otherwise operating erratically when a splice or a record previously made as a result of a splice is encountered.

Where output tapes are prepared, each must have its leading end and its trailing end prepared so that splices to other like tapes may be made. This is normally done by automatically perforating in such output tapes at these points a special (splice pattern) code and means are included in the reader circuits for automatically advancing the tapes in a continuous repetitive operation over these places in the tape.

A feature of the invention is a double check means for preventing the skipping of a valid call entry where a reader has been enabled to skip a plurality of other entries. There are several reasons for enabling a reader to operate continuously and repeatedly to skip a large number of entries so it is expedient that when the device has been started on such an operation this automatic action can be stopped with certainty.

Where perforated tapes, as the output tapes of the assembler, are spliced together a signal code is perforated in the tape so that when this code is reached, just prior to a long series of splice pattern codes the device is enabled so that so long as the splice pattern code is read, or nothing at all is read, as at the actual splice extending over two or more lines of perforations where the perforations are sealed by plastic, the tape will be stepped forwardly. The normal manner for stopping this automatic action is the response to the reading of the first tape identity entry thereafter. However, in order to assure the stoppage of this automatic operation a secondary check is made which complements the positive reading of a given code and consists of the deviation from the splice pattern code. If the automatic action is stopped by the proper positive reading of a given (tape identity) code, then the device will continue operation to perform its normal functions but if for some reason this fails and this automatic action is stopped by this secondary check of deviation from the splice pattern then the operation of the device will be halted positively and an alarm will be brought in.

Where unperforated tapes are spliced it is not certain that the perforator can penetrate a double thickness of paper reenforced by the plastic used for the physical splicing. Therefore, when an operator splices two ends of unperforated tape he also cuts a rectangular hole in the center of the tape which straddles the splice and means are then provided so that when a perforator encounters such a "window" it will automatically perforate a special code in the tape and then will perforate a series of splice pattern codes, or nothing at all where the actual splice is encountered until the window has passed through the perforator whereupon it will again perforate this special (window splice) code. Therefore, when a reader encounters a window splice code, the device will be enabled to skip the splice pattern codes (or nothing at all or splice pattern codes mutilated by the window) and this action will normally continue until the second occurrence of the window splice code. This, as in the previous case, is the positive reading of a particular code. Again, the secondary circuit operates so that if for some reason this positive reading is missed then the deviation from the splice pattern code will bring the operation of the device to a halt and in this case will bring in an alarm.

A feature of the invention may, therefore, be stated to be means for stopping an automatic repetitive operation of a reader consisting of a primary response to a given reading and a secondary response to a deviation from either another given reading or no reading at all.

The reader of each accounting device reads the codes from an incoming tape in a circuit including a reader step relay and this relay when operated will cause the incoming tape to be stepped forwardly so that the next code may be read. When a skip splice code or a window splice code is encountered the circuit of the reader is prepared to respond to (1) splice pattern codes, (2) blank codes, or (3) splice pattern codes blank in part. Each code is in the form of a six-digit number and the first place of this code may be filled with any one of the digits 0, 1, 2 and 3. The splice pattern code is 081010. No other code which is normally used directly after a splice pattern code would have a 0 in its first place. Therefore, if a code is encountered while the reader circuit is enabled to respond to the splice pattern code as above described, which as a 1, a 2, or a 3 in its first place, such a code may be either a valid code or an invalid code and in any case will cause a change to be made in the preparation of the circuit described. In either case a circuit for bringing in an alarm is activated but if the code is a valid one which will cause a legitimate operation to be made then the alarm is prevented.

A feature of the invention may then be stated as a means, operative when a reader circuit is prepared to respond in an automatic, continuous, repetitive operation to a series of splice pattern codes, for responding to a code deviating from a splice pattern code for bringing in an alarm, and additional means responsive to such a code in the event that it is a valid code for modifying the operation of said means by preventing the said alarm.

The drawings consist of eleven sheets having thirteen figures as follows:

Fig. 1 is a view showing two pieces of tape, one of which is foreshortened in order to illustrate the appearance of a tape having a window splice therein and to show the result when such a tape is reperforated;

Fig. 2 is a schematic mechanical figure showing the means for detecting a spliced unperforated tape;

Fig. 4 shows a reader, the reader contacts and the cam contacts operated thereby;

Fig. 5 shows the skip splice control circuits;

Fig. 6 shows the alarm and indicating circuits;

Fig. 7 shows the reader step control, the reader step check and the reader line count means;

Fig. 8 shows the reader relays for the A, B and C denominational orders;

Fig. 9 shows the reader relays for the D, E and F denominational orders;

Fig. 10 shows the tape identity control means;

Fig. 11 shows the window splice and perforator tape and circuits and the motor control means; and Fig. 12 shows the entry spread control means and the off-normal and start circuits.

Figure 3:
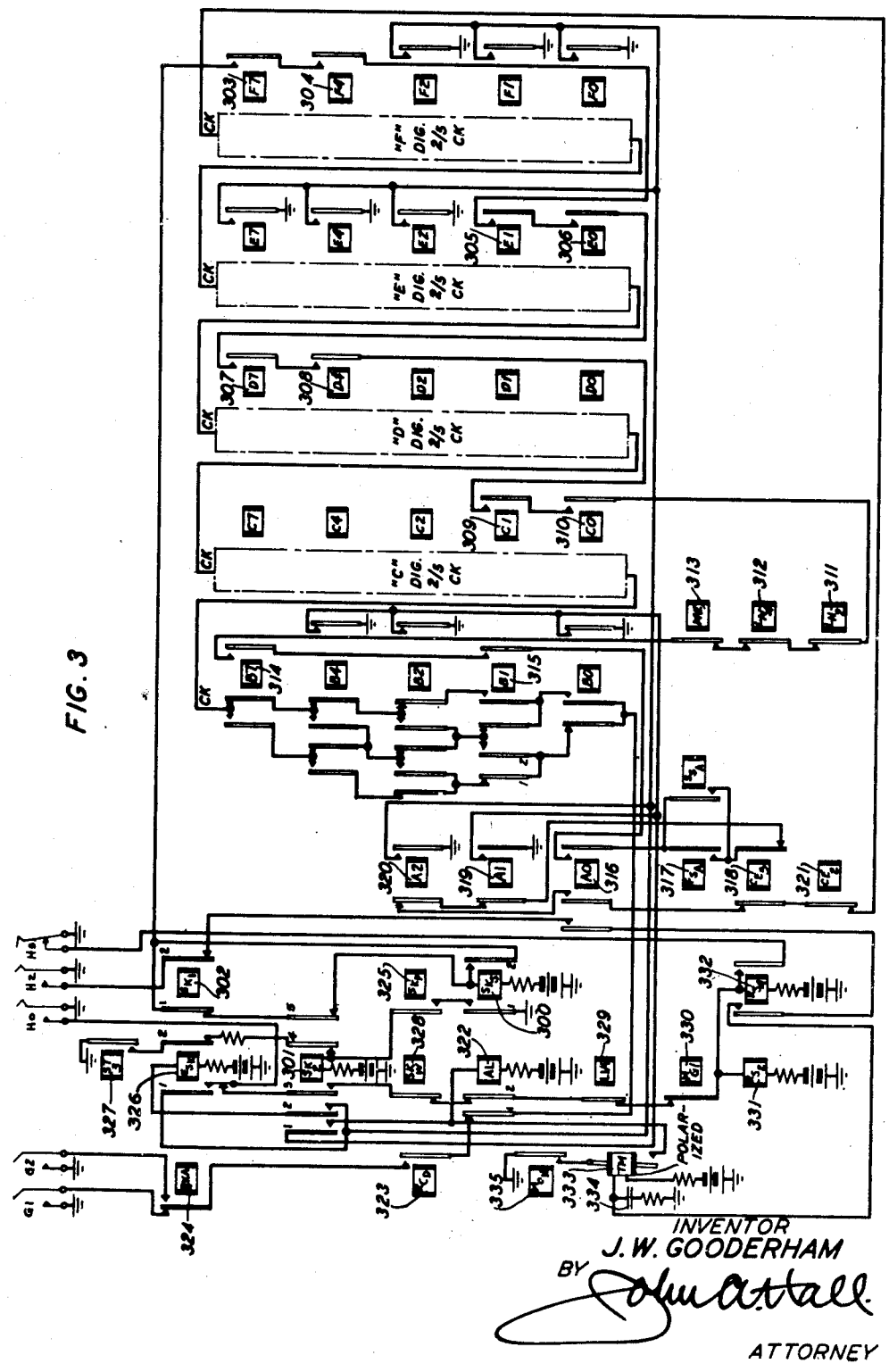
Fig. 3 is a schematic circuit diagram showing in short form the essential circuit connections and operations employed in carrying out the present invention.
Figure 4:
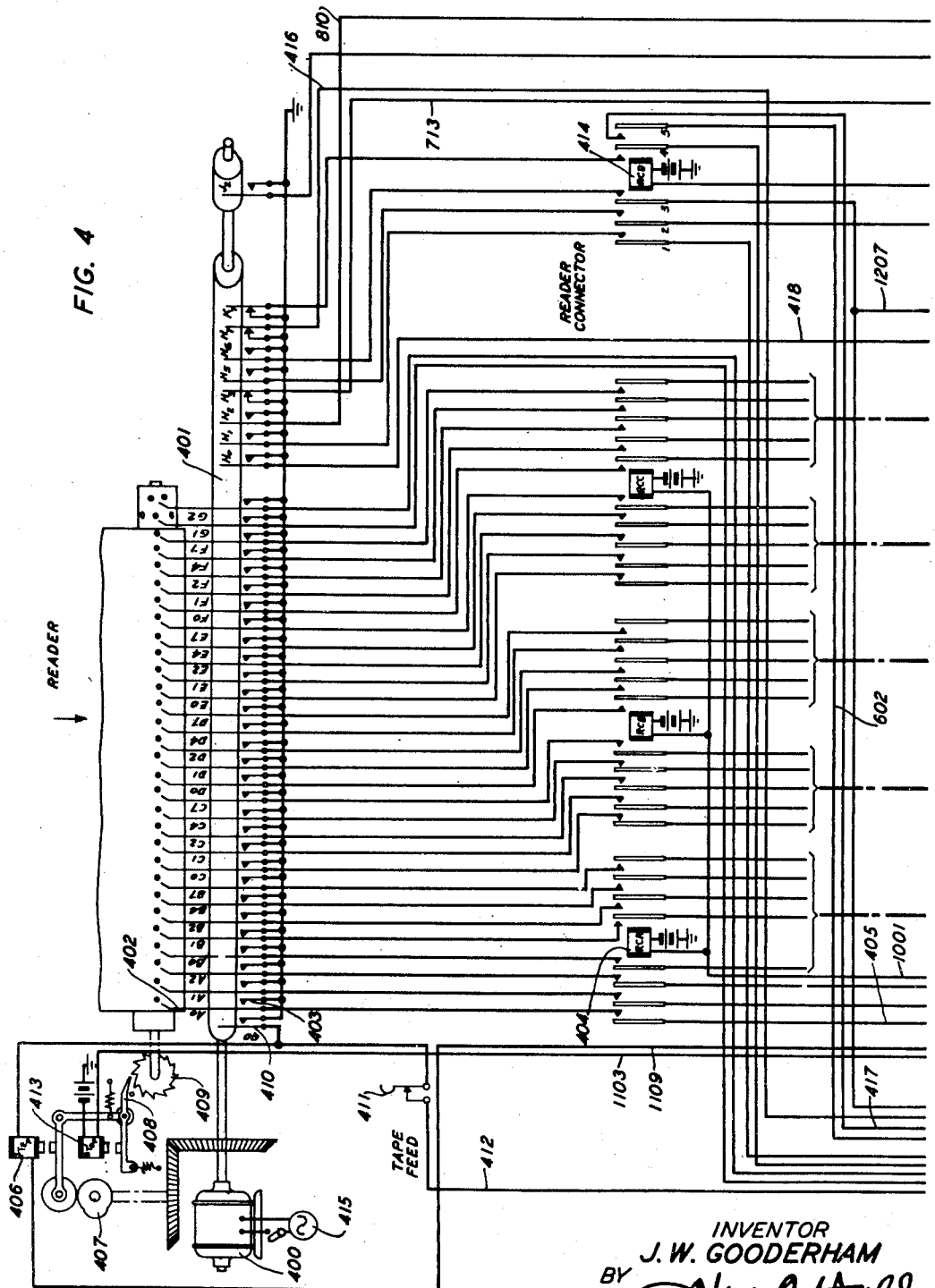
Figs. 4 to 12, inclusive, arranged as in Fig. 13 show the same circuit in much greater detail and in which individually.
Figure 5:
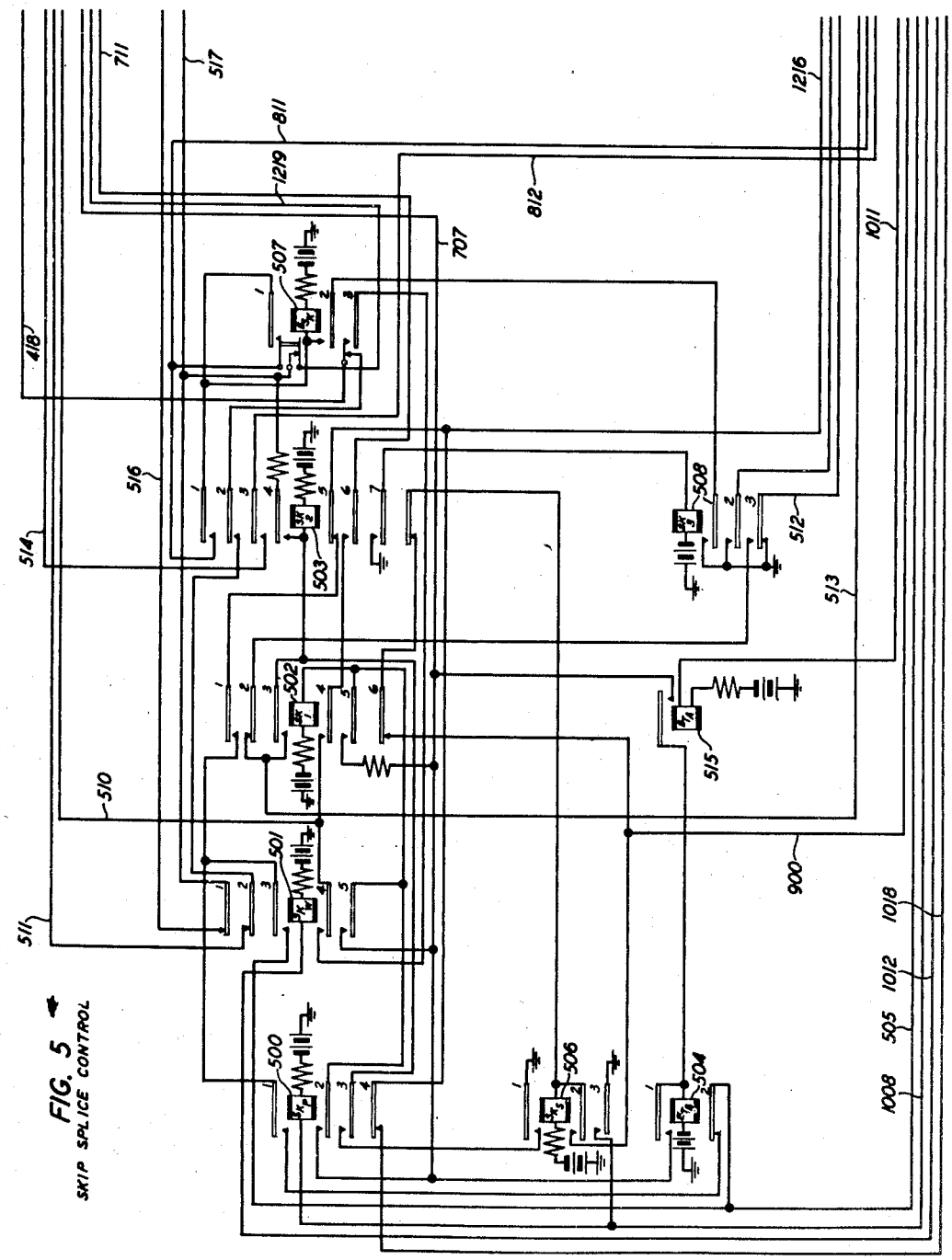
Figure 6:
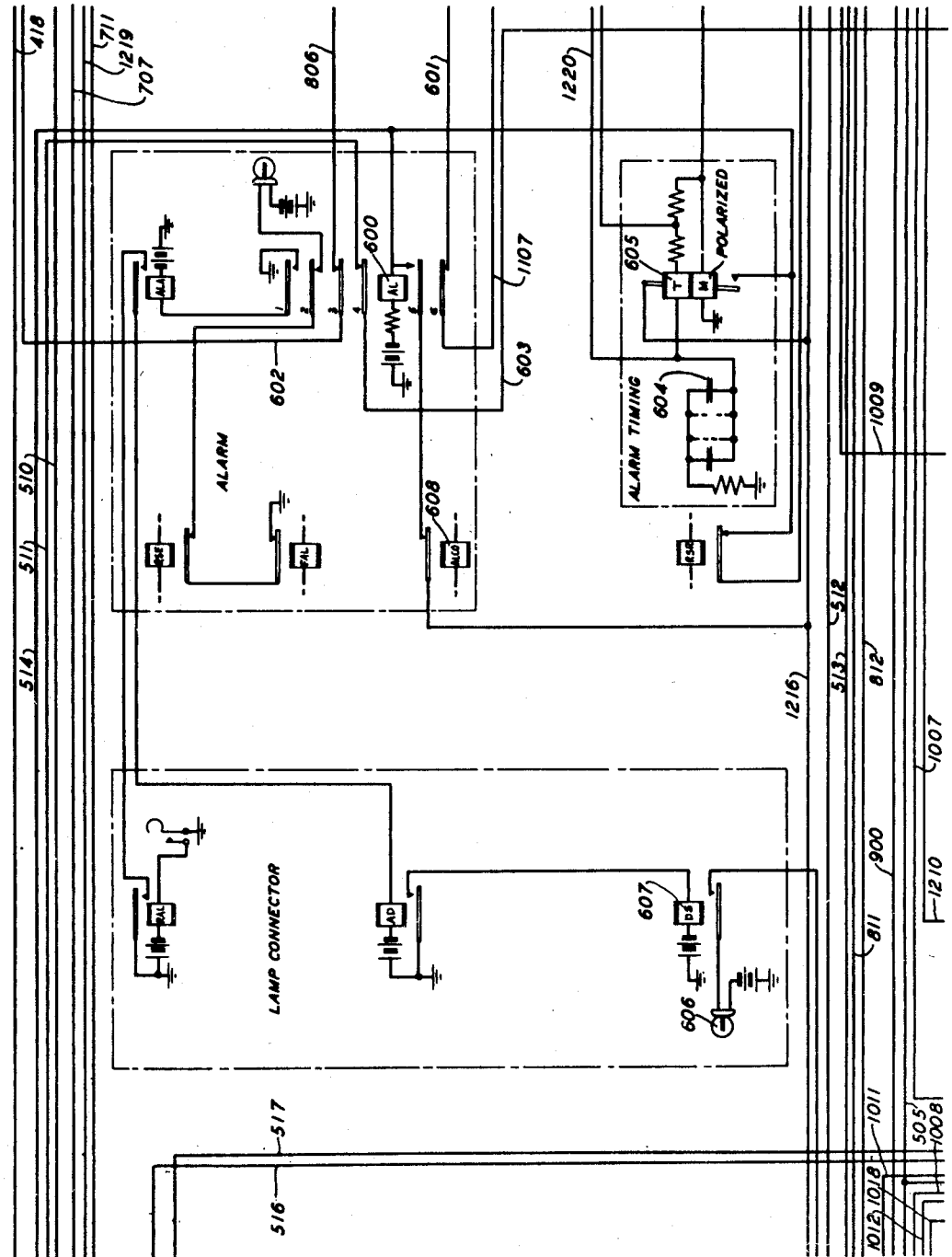
Figure 7:
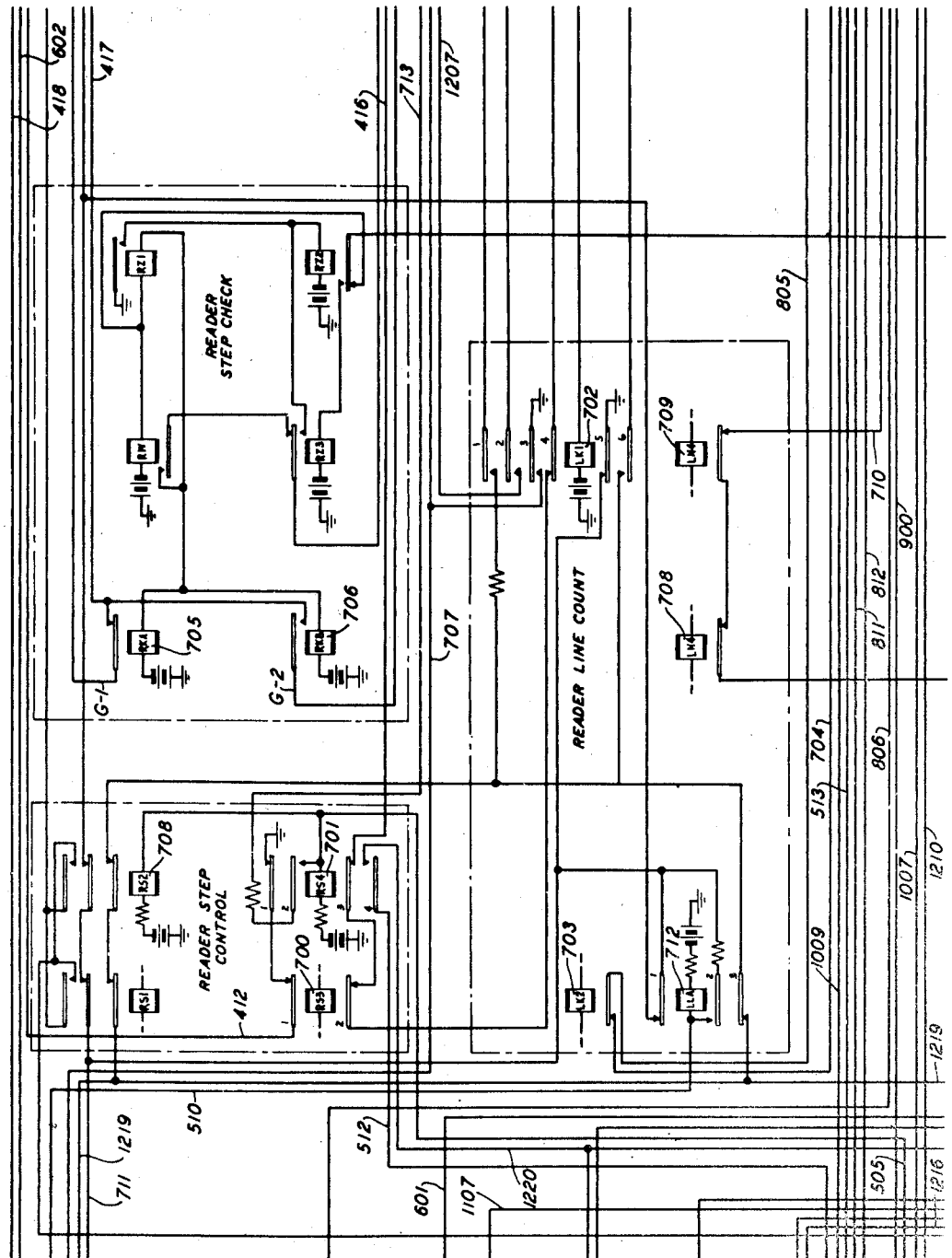

The present invention is an improvement in the assembler circuit previously disclosed in the application of Carpenter and Gooderham, Serial No. 724,992, filed January 29, 1947.

Certain mechanical details of the perforator used in forming the tapes employed in the device of the present invention are disclosed in the application of W. W. Carpenter, Serial No. 588,401, filed April 14, 1945.

Mechanical details of the interlocking operation of the step and stop magnets of the reader are disclosed in the application of W. W. Carpenter, Serial No. 788,449, filed November 28, 1947, now Patent Number 2,496,150, issued January 31, 1950.

The present invention, herein disclosed as incorporated in an assembler is employed in other accounting devices of an automatic accounting system as disclosed in the application of Joel and King, Serial No. 793,298, filed December 22, 1947.

In the accounting center devices which are operated by means of perforated tapes there are two conditions under which tapes must be spliced and under each of which conditions arrangements must be made so that when such a splice is encountered by a reader into which this spliced tape is introduced no ill effects will flow therefrom.

The first condition is that in which the unused tape is spliced. These unused tapes are fed into perforators of various kinds and must be of lengths sufficient in every tape to afford continuous operation of the perforator. Therefore, an attendant will see that when the unused end of a tape is becoming short the end of another supply of unused tape will be spliced thereto. The splicing consists of registering two pieces of tape, placing a strip of plastic adhesive between the two and heat-treating the area of the plastic. Thereafter the short ends are cut off and a window is mechanically cut in the middle of the tape to span this splice. A window splice of this nature is shown in the left-hand tape of Fig. 1 after such spliced portion has run through a perforator. In Fig. 2, certain elements of a perforator are shown, such, for instance, as the drum 1 which is a cylindrical metal piece with rows of holes formed therein. There will be provided twenty-eight such holes in each row parallel to the axis of the drum and there will be twenty-eight punches such as the punches 2 and 3 for use in perforating a single code. It is to be noted that these punches are actually in two rows so that the odd and even numbered punches are staggered. Therefore, a code will consist of perforations on two lines as indicated by the perforations blacked in in the left-hand piece of tape in Fig. 1 at the bottom thereof. As the perforator pins are operated, the tape will be perforated and moved in a left-hand direction as indicated by the end of the tape coming out from beneath the drum 1. Therefore, the tape being fed into the reader will be moved downwardly so that the window may be detected by the arm 4. When, in the movement of the tape, the arm 4 encounters the window, it will move into this space and the switch 5 will be operated thereby. This switch will cause a proper reaction in the circuit of the perforator so that thereupon arrangements can be made to perforate in the tape a series of codes which will indicate to a reader in which this tape is later introduced the condition encountered.

It will be noted on the two tapes shown that the first three codes at the top of the left-hand tape in Fig. 1 are identical with the first three codes at the top of the right-hand piece of tape in Fig. 1. It is now assumed that as this last code 141300 has been perforated that the arm 4 has found a window and has operated the switch 5. Thereupon a code 287020 will be punched in the tape followed by a long series of the splice pattern code 081010. These codes in perfect shape as shown above the window and mutilated through the window will be continued until the window has been safely passed, whereupon another code 287020 is perforated and then the tape is put back into proper service again. It will now be noted that reading downwardly the last three codes on the left-hand tape are identical with the last three codes on the right-hand portion of the tape. The right-hand portion of this tape now represents the result which would be achieved if the codes of the left-hand portion of the tape were being reproduced in one of the accounting devices.

It also should be noted that in the middle portion of the left-hand tape of Fig. 1 an actual splice is represented and that at this point no code perforations appear in the tape. While perforations often appear at this point the double thickness of paper and the plastic by which the two pieces are secured is believed to be more than the perforator can be expected to perforate and, therefore, means are provided in the circuit and which will be explained hereinafter to ride over these unperforated splice pattern codes.

In other circumstances a splice will be perforated in which this window does not exist. Such a splice comes from the fact that every tape which is perforated has first a long series of the splice pattern code 081010 and then a single code such as 286XXX which is a signal that an ordinary splice may be expected or has been completed. After a tape has been fully perforated and must be taken from the perforator for use in some other accounting machine, the trailing end is similarly perforated, that is, first a 286 code is perforated therein followed by a long series of the splice code 081010. Therefore, a leading end of one tape may be spliced to a trailing end of another in the same manner as hereinbefore explained. In this case the perforations at the actual splice will be definitely sealed by the plastic splicing material so that when such a spliced tape is run through a reader no codes will be read therefrom.

The present invention concerns itself with means for causing a reader to skip over a splice either of the one kind or the other at the maximum rate of speed of the reader. In the circuit of each reader there is a relay known as the reader step relay and this is placed in an automatic circuit whenever a 286 or a 287 code is encountered so that thereafter the action of the reader becomes automatic at high speed. Means must, therefore, be provided to definitely stop this automatic action so as not to overrun a legitimate code. This is done by making a double check, first, to see that the code beyond the last of the splice pattern codes is a legitimate code such as the 286 or the 287 code and second, to see that it is a deviation from the splice code. Therefore, the automatic operation by which the reader is conditioned to pass through the spliced tape at high speed is stopped. Fig. 1, therefore, shows in the short right-hand portion of tape the appearance of a tape produced in an accounting device when the left-hand portion of Fig. 1 runs through a reader.

For the benefit of he who might be interested, the vertical lines and the weight attached to the perforations therein are shown at the top of each tape under the heading of the letters A to F, inclusive. The A digit so-called has three places weighted 0, 1 and 2 while each of the other five digits have five places weighted 0, 1, 2, 4 and 7. This is known as a two-out-of-five code in which each digit is expressed by two perforations in the five possible places. The make-up of any one code across the tape is shown by the perforations blacked out at the bottom of this tape and indicated by the short lines pointing thereto and to the digits which these perforations represent.

The reader of one of these accounting devices is a motor-driven device which has a line of twenty-eight sensing fingers which are constantly being reciprocated back and forth toward the paper tape. Where a perforation is encountered the sensing finger protrudes through it and by this extra movement closes an electrical contact which will result in the operation of a corresponding relay such as the twenty-eight relays marked A0 to F7, inclusive, in Fig. 3. There are also a number of cam contacts which are being constantly and cyclically operated such as the five shown in the upper left-hand corner of this figure and designated G1, G2, H0, H2 and H3. Those which are normally shown open such as the first four of these will close simultaneously with the operation of the sensing fingers to operate the reader relays. Others such as the H3 contact are closed at just the opposite time in a reading cycle, that is, during the period when the fingers are away from the paper.

With this understanding, Fig. 3 may be used to explain the operation during the period that the splice pattern code 081010 is being repeatedly read. On the first encounter of this code a circuit will be established for the SKS relay 300 which may be traced from battery through the winding of this relay, the back contact and armature 5 of the SK2 relay 301, the back contact and armature 1 of the SK1 relay 302, thence in series through the contacts of the F7 relay 303 and the F4 relay 304 expressing the code for zero, the E1 relay 305 and the E0 relay 306 expressing the value 1, the D7 relay 307 and the D4 relay 308 expressing the value zero, the C1 relay 309 and the C0 relay 310 expressing the value 1, through a series of contacts controlled by the LN2 relay 311, the LN4 relay 312, the ME relay 313, the B7 relay 314 and the B1 relay 315 expressing the value 8, the A0 relay 316 expressing the value zero, thence through a contact of the FSA relay 317 which is closed at this time, the CE3 relay 318, back contacts of the A1 relay 319 and the A2 relay 320 and a closed contact of the A0 relay 316, through another back contact of the CE3 relay 318, the CE2 relay 321 and thence through a check circuit for each of the denominational orders F, E, D and C indicated by broken line rectangles and a similar check circuit shown in detail for the B relays consisting in this case of a front contact and armature 1 of the B7 relay, a back contact and armature of the B4 relay, a back contact and armature of the B2 relay, a front contact and armature 2 of the B1 relay 315, a back contact and armature of the B0 relay, armature 1 and back contact of the AL relay 322, armature and front contact of the now operated RCD relay 323, armature and back contact of the RKA relay 324 to the G1 contact which is closed at the time that the reader relays mentioned will be operated. Therefore, upon the first encounter of this splice code 081010 the SKS relay 300 will be operated. This relay will, therefore, lock in a circuit including its front contact and armature 2 to by-pass the back contact and armature 5 of the SK2 relay 301 and the back contact and armature 1 of the SK1 relay 302. This is for the following purpose. It will be shown that shortly the SK2 relay 301 will be operated and the SKS relay 300 must be held operated until the G1 contact is finally opened.

In a manner which will be described more fully hereinafter the SKP relay 325 will also be operated by this circuit so that now a circuit is completed from ground, the armature 1 and front contact of the SKS relay 300, the front contact and armature of the SKP relay 325 to the winding of the SK2 relay 301. The SK2 relay now operates and locks in a circuit including its front contact and armature 4, a back contact of the ESK relay 326, a front contact and armature of the ST3 start relay 327 to ground. Therefore, the SK2 relay is now locked and will remain locked until either the start relay 327 is released or the ESK (end of skip) relay is operated. The operation of the SK2 relay 301 opens the original energizing circuit of the SKS relay so that as soon as the end of this cycle is reached and the G1 contact is opened the SKS relay will return to normal.

The operation of the SK2 relay now closes a circuit from the H0 contact through the normal contacts of armature 1 of the ESK relay 326, armature 3 and front contact of the SK2 relay 301, armature and back contact of the SKW relay 328, back contact and armature 2 of the AL (alarm) relay 322, armature and back contact of the L1A relay 329, back contact and armature of the MG1 relay 330 to the winding of the step relay such as the RS2 relay 331 and the RS4 relay 332. Thus, the RS2 and RS4 relays (which actually constitute a single multicontact relay since their windings are in parallel) operate upon the closure of the H0 contact and hold over during the remainder of the cycle through the closure of the H3 contact which is included in the locking circuit of these relays. The RS2 and RS4 relays are, therefore, continuously operated so that the reader will advance the tape on each operation of the reader sensing fingers. (Ordinarily the reader step relay is in a circuit dependent on certain checking circuits.).

One manner in which this operation may be stopped is through the operation of the ESK relay 326 which opens the main operating circuit for these reader step relays. The circuit for the ESK relay may be traced through the armature 2 and front contact of the SK2 relay to a circuit which may be closed to ground through the front contact and armature of the A2 relay 320, the front contact and armatures of the E2, E4, E7, F0, F1, and F2 reader relays. It will be remembered that during the passage of the splice pattern through the reader that the E0 and E1 relays are operated and that the E2, E4 and E7 relays are not operated. Likewise, the F4 and F7 relays are operated whereas the F0, F1 and F2 relays are not operated. Therefore, any deviation from the values 01 in the E and F digits will ground the conductor leading to the winding of the relay 326 so that the end of skip relay ESK will respond to any deviation from this code in its last two digits. Likewise, if the expected code 286 or 287 is encountered, the A2 relay 320 will ground this conductor and cause the operation of the end of skip relay 326. At this time the original circuit for the reader step relays will be opened and the ESK relay will lock in a circuit from the H0 contact through its front contact and armature 1 so as to remain operated until the H0 contact opens to avoid the reoperation of the reader step relays 331 and 332.

Another manner in which the reader step relays may be released is through the operation of the alarm relay 322 as, for instance, when the A1 relay 319 is operated or any one of the B0, B2 or B4 relays is operated. The operation of any one of these relays will indicate not only a deviation from the code which has been passed through the reader but an erroneous deviation which must bring in an alarm. Therefore, the operation of the A1, the B0, B2 or B4 relays will ground a conductor leading through armature 1 of the front contact of the SK2 relay to the winding of the AL relay 322 whereupon this relay operates and opens the circuit for the reader step relays.

There is a further circuit for operating the alarm relay from the H2 contact through the armature 2 and back contact of the SK1 relay 302, the front contact and armature 1 of the A0 relay 316, the armature 1 and front contact of the RS4 relay 322, through the winding of the TM relay 333. The momentary closure of this circuit by the H2 contact operates the TM relay 333 to the position shown so that ground will not be extended to the winding of the alarm relay 322. During the open period of the H2 contact the condenser 334 will require enough current for charging purposes to hold the TM relay 333 operated. Therefore, it is not until the circuit to the H2 contact is held opened for some time as, for instance, by the failure of the A0 relay 316 to operate that the TM relay will move its armature to the right to extend the ground from the armature of the MON relay 335 to the alarm relay 322. By this means the reader may fail to operate the A0 relay several times as the actual splice is passing through the reader without operating the alarm. The sizes of the condenser 334 and the other circuit elements are so proportioned that the reader may pass several codes without bringing in an alarm, but more than this given number will allow the condenser 334 to become fully charged whereupon the TM relay will close the circuit to the alarm relay 322 and thus stop the automatic operation of the reader.

DETAILED DESCRIPTION

The reader

The reader provides means for reading the codes perforated in the tape. It is operated by a motor 400 which is under control of the motor start key 1100 and the assembler circuit relays. The rocker arm 401 of the reader which carries the twenty-eight reading pins moves the reading pins in to read the holes in the tape on each revolution of the reader shaft. The make contacts are associated with each reader pin so that when the pin finds a hole in the tape the associated contact closes and indicates the reading to the assembler circuit. By way of example, the A0 reader pin 402 when it finds a hole will close a circuit from ground to the contact 403 which will be traced through the front contact and first armature of the RCA relay 404 and extend this ground over conductor 405 through the front contact and armature 2 of the ST3 relay 1206 to the winding of the A0 relay 800. In like manner each other one of the reader pins will extend connections to a reader relay shown in Figs. 8 and 9 having a like designation.

In addition to the reading contacts there are several other sets of contacts which are controlled by cams on the reader shaft to close on each revolution of the shaft. They are used to control various circuit functions.

Two electromagnets are mounted on the reader, one to control stepping of the reader drum and the other to take control of stepping away from the step magnet and not allow the reader drum to advance.

When the step magnet 406 of the reader is not energized the reader will function to rotate the drum and step the tape to the next line on each revolution of the reader shaft. It will be noted that in the position shown the end of the armature of the step magnet 406 is in contact with a cam 407 and this will allow a pawl 408 to engage a ratchet 409 for the purpose of moving the reader drum. When the step magnet 406 is energized the spring controlling the rotation of the drum will not release and the reader will not step to the next line. The winding of the step magnet is connected to ground through the G0 contact 410 controlled by the rocker arm. Thus, the magnet cannot release while any pins are in the tape in the reading process. The G0 contact closes when the rocker arm moves the pins into the tape. Normally the circuit controls stepping of the reader by a ground path from a contact on the reader step relays. This may be traced through the tape feed key 411 over conductor 412, the armature 1 and back contact of the RS3 relay 700, the armature 1 and back contact of the RS4 relay 701 to ground. Thus, when the RS4 relay is released the step magnet 406 is operated so that the reader drum cannot be moved. When the reader step relay 701 is operated, this circuit is opened so that the armature of the step relay 406 may be actuated by the cam 407 to step the reader drum.

A stop magnet 413 is provided to keep the reader drum from advancing. It is effective only when deenergized. When starting the operation of the reader it is arranged to operate after the step magnet is energized. When shutting down it is arranged to be released before the step magnet is released. Thus, when power is removed from the circuit for any reason while processing calls the tape is not allowed to advance falsely. Ground is supplied to the stop magnet winding by operation of the RDR relay 1101 and the MST relay 1102 in a circuit which may be traced from ground, the front contact and armature 1 of the motor start relay 1102, the front contact and armature 2 of the reader start relay 1101, conductor 1103 to the winding of the stop magnet 413.

Contacts G0, G1 and G2 operate from the rocker arm 401 which controls the tape reading pins. Contact G0 closes when the reading pins enter the holes in the tape and is used to energize the step magnet 406. Contacts G1 and G2 make contact on alternate steps of the reader. They are used to check that the reader steps when the RS relays operate. On alternate steps each supplies ground to the input check circuit of the assembler. Contacts H0, H1, H2, H5, H6 and J2 operate from cams on the reader shaft and are arranged to operate at the same time as the reading pin contacts. Contacts H3, H7 and K7 are break contacts and are arranged to close ground circuits during the time that the grounded circuits controlled by the other cam contacts are opened. Thus, for instance, a relay which will derive ground from both the H0 and the H3 contacts will remain continuously operated.

Figure 8:
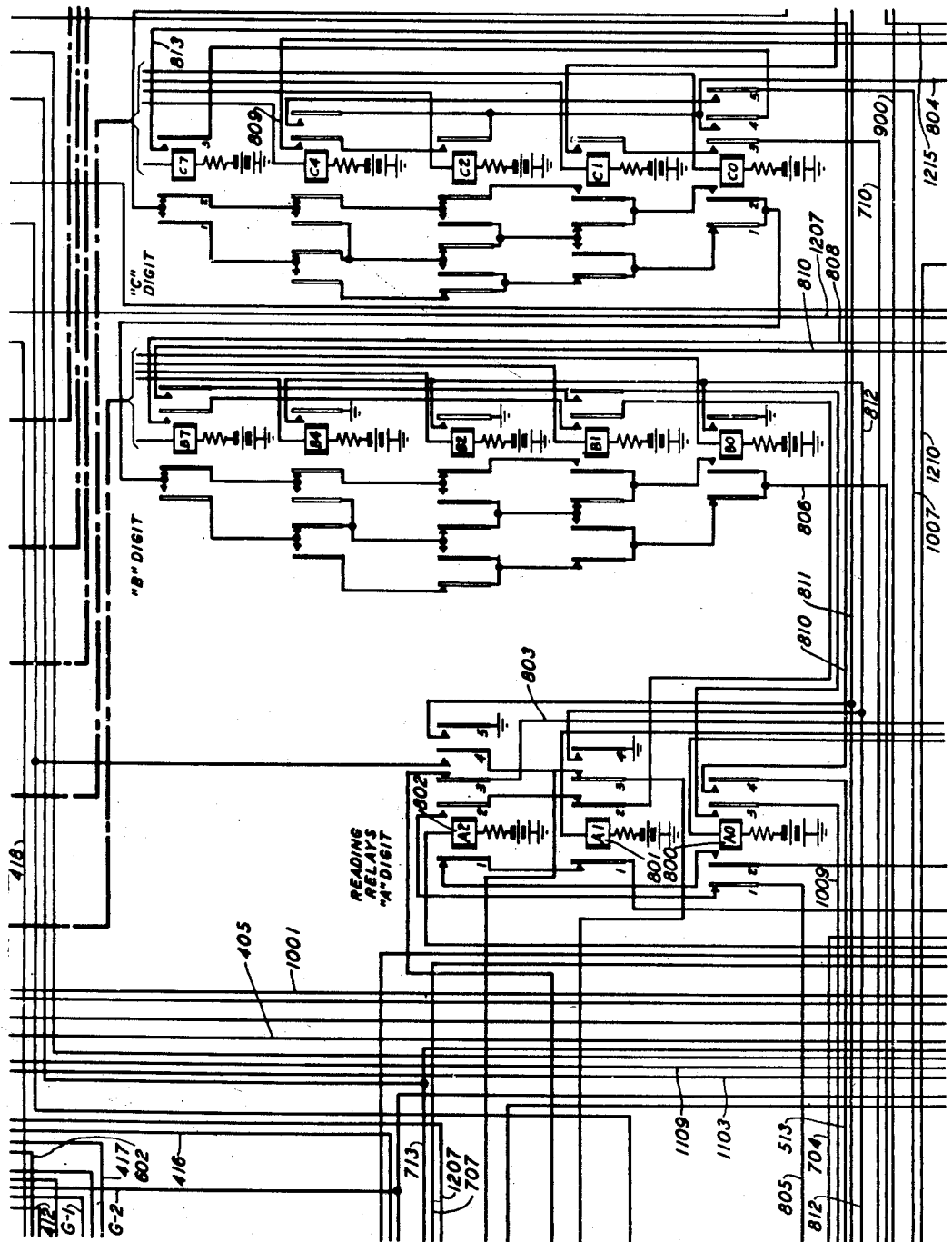
Figure 9:
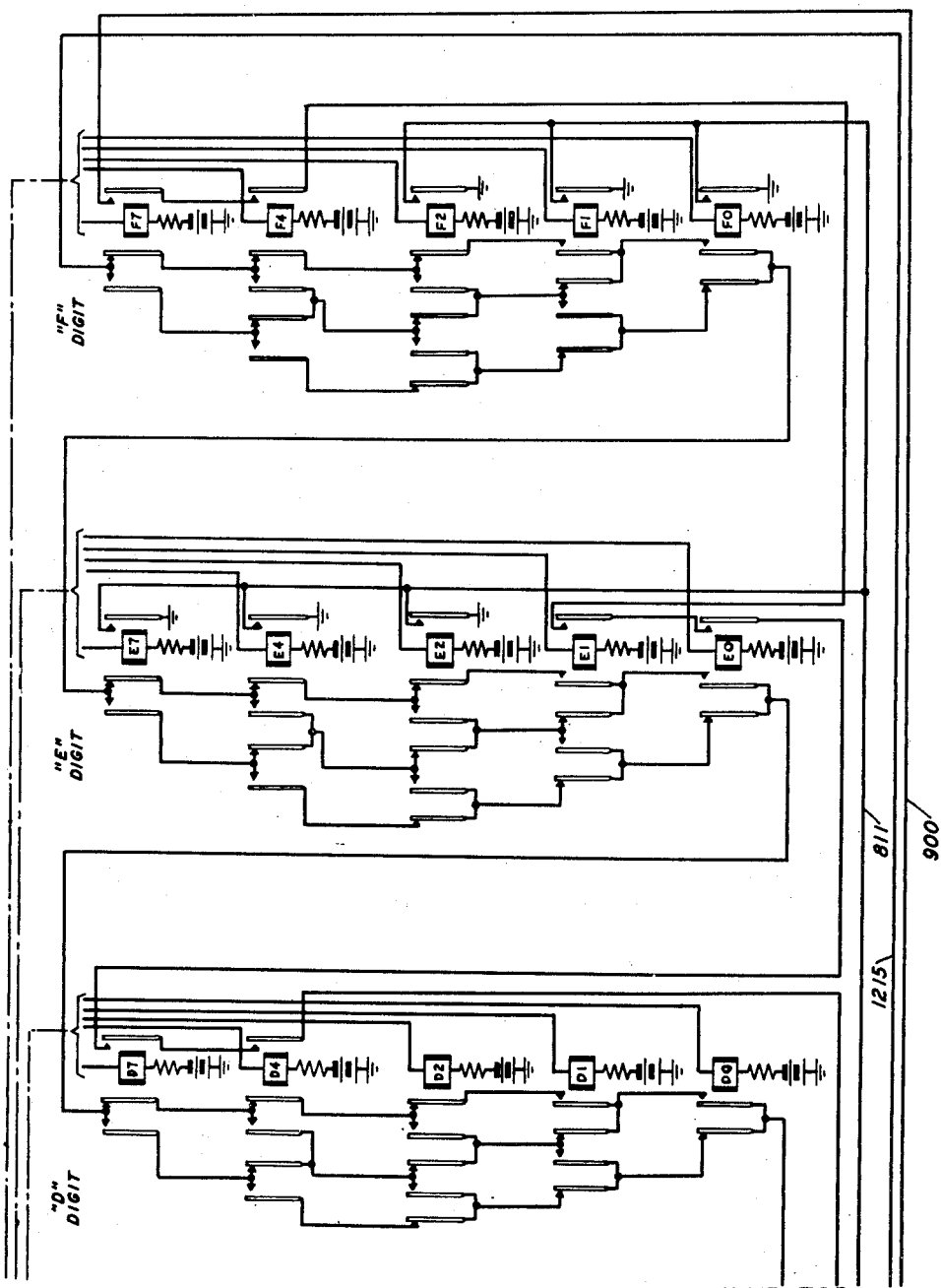
Figure 10:
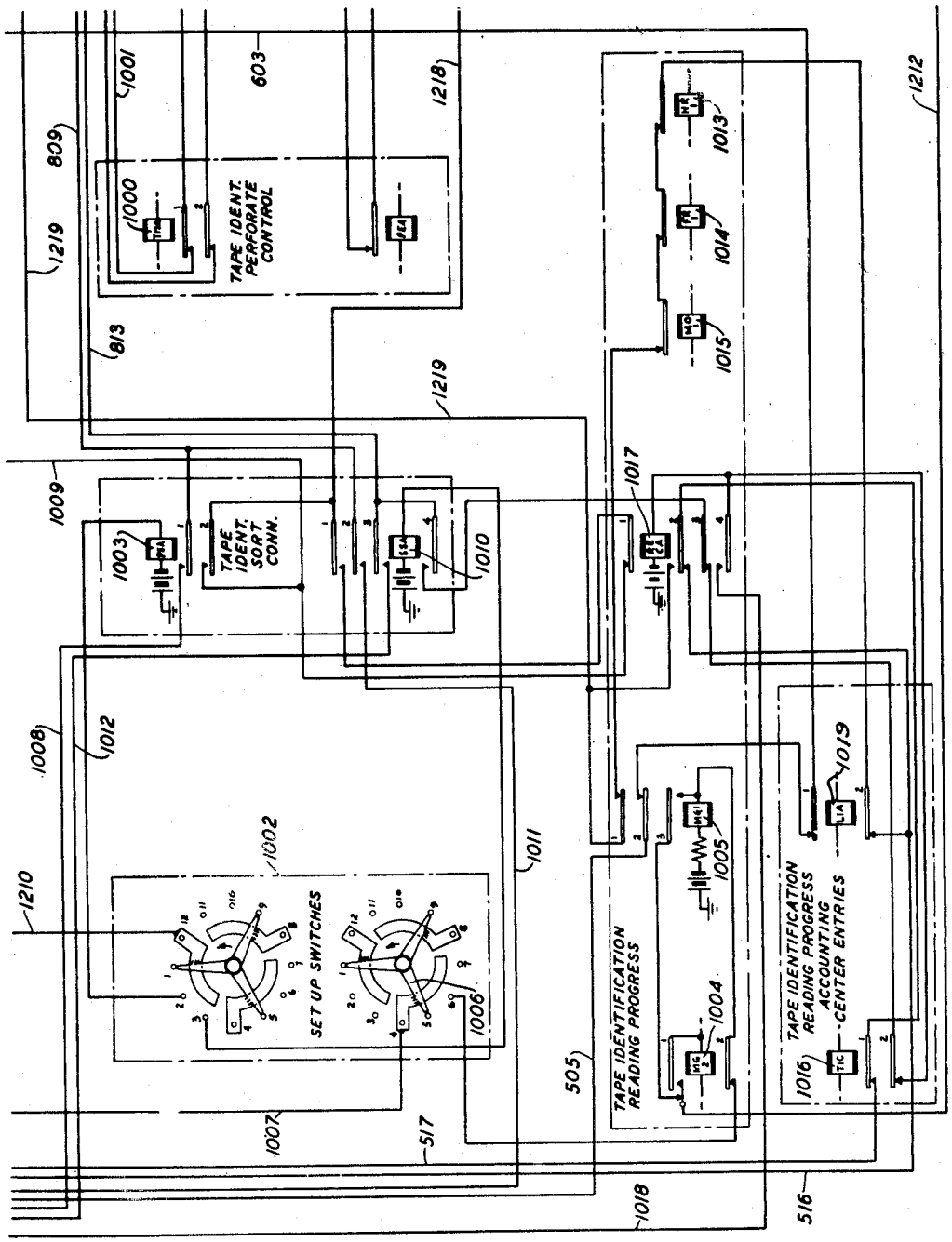
Figure 11:
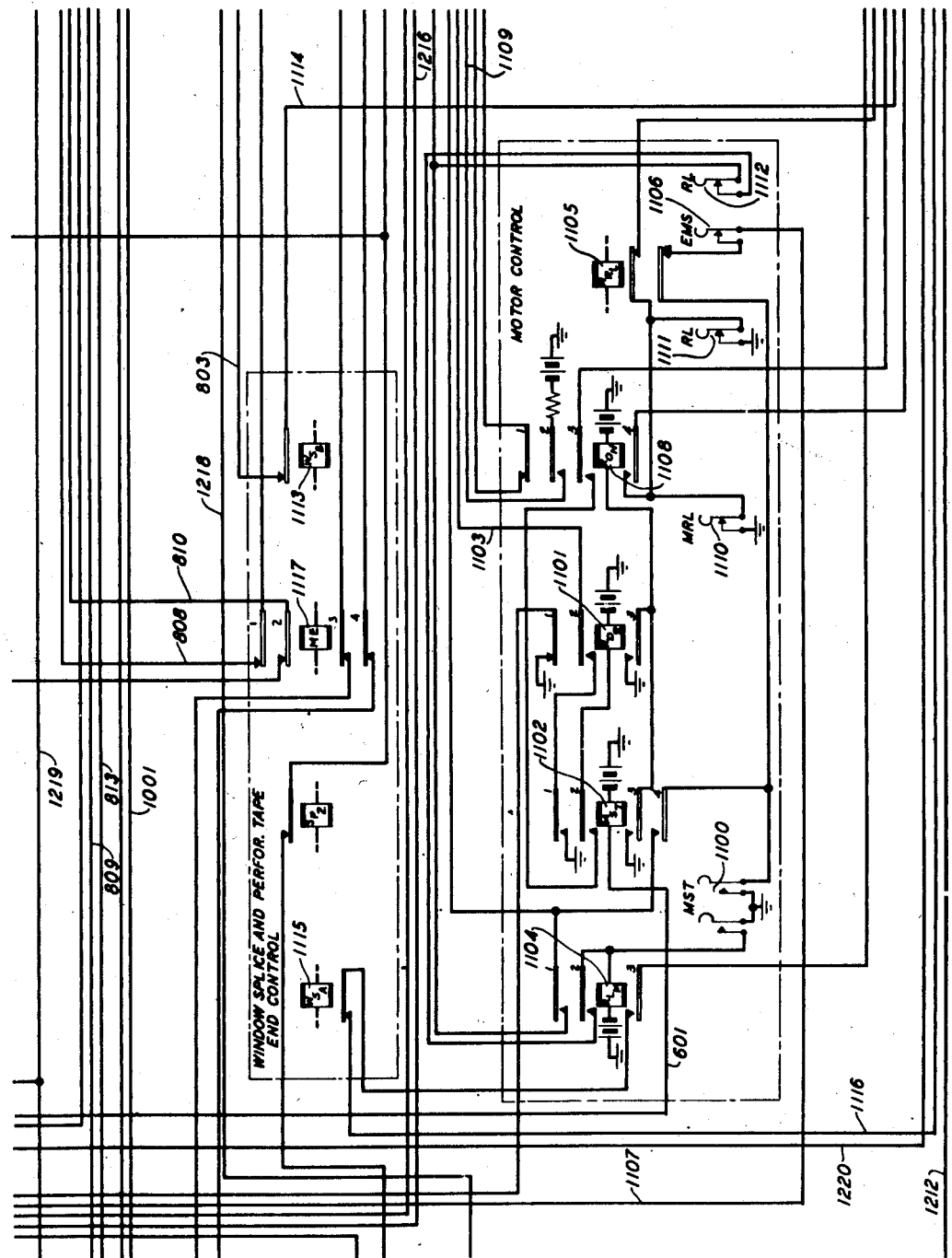
Figure 12:
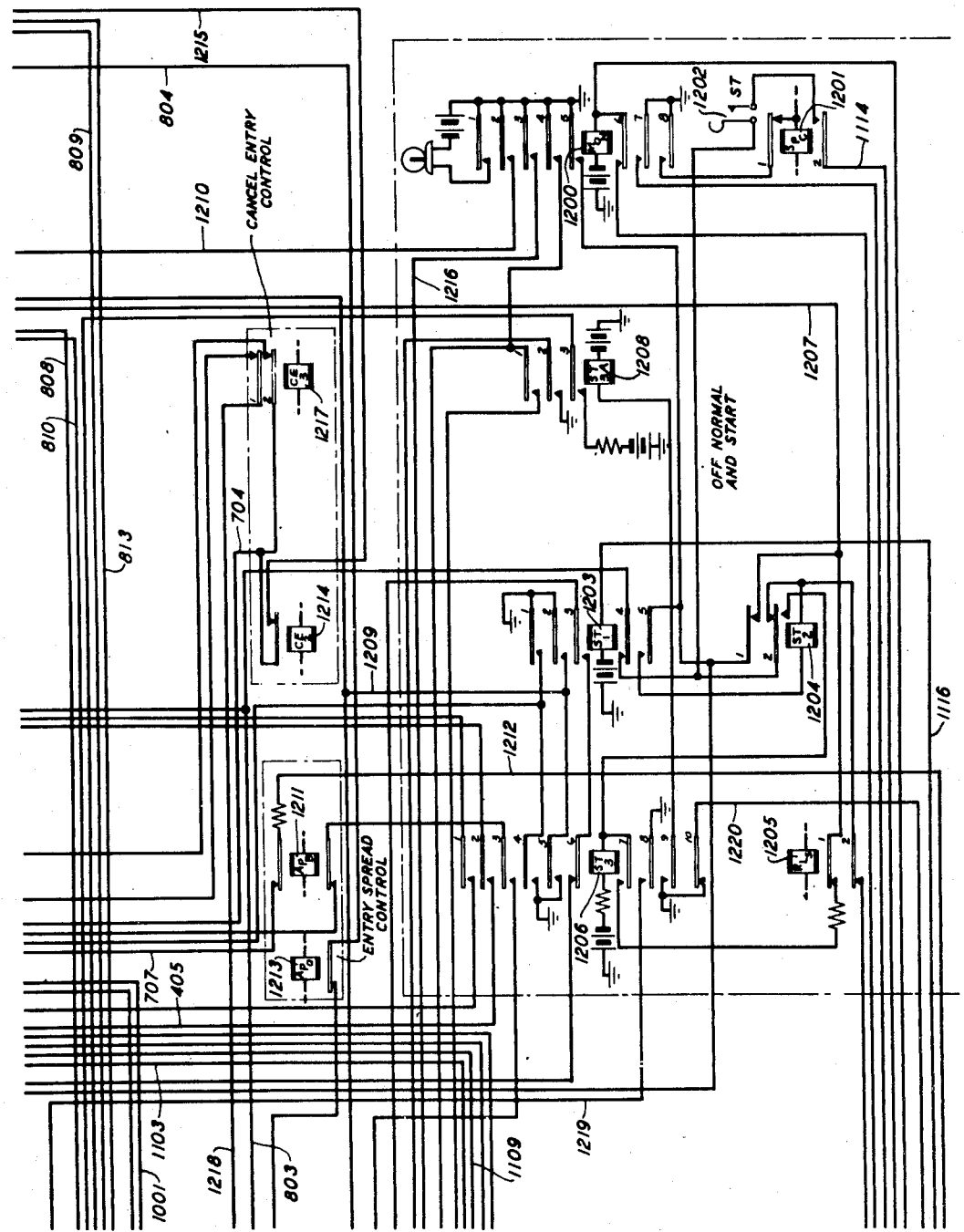

The RCA relay 404 and the other two relays shown in line therewith and connected in multiple thereto are known as the reader connector and are used for connecting the contact pins to the reading relays of Figs. 8 and 9. The RCD relay 414 is the reader connector for the common contacts and will be operated at the same time as the reader connector for the reading relays.

*Operation of motor control relays*

Certain relays are provided to control the supply of battery or ground to the reader start RDR relay 1101, the step magnet 406 and the stop magnet 413 to control running of the reader motor and to supply off-normal grounds to the assembler circuit. These relays are operated under the control of the motor start MST key 1100 when the motor is started at the beginning of an operation.

With all relays normal, operation of the motor start key 1100 operates the release motor RLM relay 1104 and the MST relay 1102. The circuit for the RLM relay 1104 is obvious. The circuit for the MST relay 1102 may be traced from ground, the right-hand contacts of the MST key 1100, armature 2 and back contact of the MRL relay 1105, the contacts of the EMS key 1106, conductor 1107, armature 6 and back contact of the alarm AL relay 600, conductor 601 to the winding of the MST relay 1102. Through the operation of the MST relay a ground is extended to the winding of the reader off-normal RON relay 1108 so that this relay now operates. The RON relay 1108 supplies battery to the reader step magnet from battery, its armature 2 and front contact, conductor 1109 to a terminal of the step magnet 406. The RON relay 1108 also completes a path to operate the master off-normal MON relay 1200 which circuit may be traced from either of ground supplied by either of the keys 1110 or 1111, the front contact and armature 4 of the RON relay 1108, the winding of the MON relay 1200 to battery. The master off-normal relay 1200 now locks through its armature 5 and front contact, through the back contact and armature 1 of the MRL relay 1105 to ground supplied by either of the keys 1110 or 1111. When the master off-normal relay 1200 operates, a ground is supplied to operate the RDR relay 1101 which may be traced from ground, armature 6 and front contact of MON relay 1200, armature 3 and front contact of RON relay 1108, front contact and armature 2 of MST relay 1102 to the winding of RDR relay 1101 so that this relay now becomes operated. The master off-normal relay 1200 also supplies locking ground to the RLM relay 1104 and the MST relay 1102. The RLM relay 1104 is locked in a circuit from its winding, its armature 2 and front contact, the contacts of the RL key 1112, the front contact and armature 4 of MON relay 1200 to ground. This ground may also be traced through the front contact and armature 1 of the RLM relay 1104, the front contact and armature 4 of the MST relay 1102 to the contact of the MST key 1100 which caused the operation of the MST relay 1102 so that when this key is released the MST relay 1102 will be maintained operated.

Upon the operation of the RDR relay 1101 a circuit is completed from ground, front contact and armature 1 of the MST relay 1102, front contact and armature 2 of the RDR relay 1101, conductor 1103 to the winding of the stop magnet 413 so that this magnet now becomes operated and closes a circuit from the power source 415 to operate the motor 400.

Master off-normal grounds are now supplied to the circuit. The reader step and stop magnets are energized and the motor is running so that the circuit can be started in operation.

*Start key operation*

The start key is made ineffective until a splice pattern has been perforated on the leading ends of the output tapes. Thus, the splice pattern complete SPC relay 1201 is provided to operate after completion of splice pattern perforation. The manner in which this relay is operated will not be set forth in detail here but it will be merely set forth that when the assembler is to be placed in operation, means are provided under the control of a tape end key (not shown) to cause a number of splice patterns to be perforated on the leading end of each of the output tapes after which and upon the release of the tape end key the SPC relay 1201 will become operated and locked through the armature 8 and front contact of the MON relay 1200. With the splice pattern complete SPC relay 1201 operated, the start key 1202 may be effectively closed so that a circuit may be established for the operation of the ST1 relay 1203. This circuit may be traced from ground on the H7 reader break contact, conductor 416, the back contact and armature 3 of the RS4 relay 701, the back contact and armature 2 of the RS3 relay 700, the back contact and armature 4 of the LK1 relay 702, the back contact and armature 3 of the A2 relay 802, conductor 803, back contact and armature of the WSB relay 1113, conductor 1114, armature 2 and front contact of the SPC relay 1201, the contacts of the ST key 1202, the armature 2 and back contact of the ST2 relay 1204, armature 2 and back contact of the RLS relay 1205, armature 3 and back contact of the RLM relay 1104, armature and back contact of the WSA relay 1115, conductor 1116 to the winding of the ST1 relay 1203. Thus, the ST1 relay 1203 operates during a break reader period and when the reader contact H7 breaks the ST2 relay 1204 will operate in series with and will lock the ST1 relay 1203 under control of the WSA, RLM, RLS and MON relays. Upon the operation of the ST1 relay, the circuit from the back contact of armature 2 of the ST2 relay is now extended through the winding of the ST2 relay, the front contact and armature 5 of the ST1 relay 1203 to the front contact and armature 5 of the MON relay 1200 to ground but the ST2 relay cannot operate as long as the H7 contact supplies ground over the circuit hereinbefore traced. When, however, the H7 contact breaks then the ST2 relay operates in series with the ST1 relay and is maintained so operated under control of the relays mentioned. With the ST1 relay 1203 and the ST2 relay 1204 operated, a circuit is established during the next reader break period from contact H7, conductor 416, the back contact and armature 3 of the RS4 relay 701, the back contact and armature 2 of the RS3 relay 700, the back contact and armature 4 of the LK1 relay 702, the back contact and armature 3 of the A2 relay 802, conductor 803, armature 4 and front contact of the ST1 relay 1203, armature 2 and front contact of the ST2 relay 1204 to the winding of the ST3 relay 1206 so that this start relay now operates. The ST3 relay 1206 will lock through its armature 4 and front contact, the back contact and armature 1 of the RLS relay 1205, the front contact and armature 1 of the ST2 relay 1204, the front contact and armature 5 of the MON relay 1200 to ground. Relay ST3 also has an auxiliary locking path over conductor 1207 leading in one direction through armature 3 of the RCD relay 414 to the H6 reader contact and in another direction through the front contact and armature 2 of the LK1 relay 702 (when operated) to a ground supplied by the master off-normal relay 1200. The ST3A relay 1208 is operated from the armature 9 and front contact of the ST3 relay. The RCA relay 404 and its companion relays are operated from a ground supplied over armature 2 and front contact of ST1 relay 1203, to conductor 1209 or from ground over front contact and armature 6 of the ST3 relay 1206 to conductor 1209 which may then be traced directly to the winding of the RCD relay 414 and through the armature 3 and back contact of the ME relay 1117, the armature 1 and back contact of the tape identity start T1SA relay 1000, conductor 1001 extending in parallel to the winding of the RCA, RCB and RCC relays. These relays connect the reading contacts of the reader to the leading relays of Figs. 8 and 9.

*Set-up switches*

The assembler is provided with a number of "set-up" switches which are set manually in both the first and second sorts before the tape processing operation is started. These switches serve to check the tape identity information on the leading ends of the central office tapes and on the first sort output tapes which will be processed in the second sort to insure that the correct tapes are being used. They also provide the tape identity information which is perforated on the output tapes. In the present case only a single one of these switches has been shown, that consisting of the devices shown in the broken line rectangle 1002 and here only certain essential connections with which we are at present concerned are shown. This is the switch known as the "sort" switch and is shown in its normal unoperated position. Let it be assumed that a central office tape is to be processed by this assembler. Therefore, these switches will each be turned one step in a counterclockwise direction. Therefore, a circuit may be traced from ground, armature 2 and front contact of the MON relay 1200, conductor 1210, through the upper arm of the sort switch to the winding of the first sort FSA relay 1003. Thus the FSA relay is operated during the first sort operations which we will now assume to take place.

As a matter of interest when the incoming tape has progressed beyond the splice pattern codes the first code to be encountered is the 284XXX code known as the marker group code. As this code is encountered the LK1 relay 702 will be operated in a circuit from the H5 reader cam contact through the front contact and armature 2 of the RCD relay 414, the front contact and armature 4 of the A2 reader relay 802, the back contact and armature 3 of the A1 relay 802 to the winding of the LK1 relay 702. Thereupon a circuit will be established for the operation of the MG1 relay 1005 from its winding through the armature 2 and back contact of the MG2 relay 1004, the arm 1006 of the sort switch in its first sort position, conductor 1007 to a circuit closed by the reading relays of the A, B and C orders representing the number 284 and which may be traced through the armature and front contact of the C0 relay, the contact and armature of the C4 relay representing the value 4, conductor 804, the armature and back contact of the AP0 relay 1213, armature 1 and back contact of the ME relay 1117, a front contact and armature of the B7 relay and a front contact and armature of the B1 relay representing the value 8, thence through armature 2 and back contact of the A1 relay and armature 2 and front contact of the A2 relay representing the value 2, through the back contact and armature 1 of the A0 relay, conductor 805, through the armature and back contact of the LK2 relay 703, conductor 704, armature and back contact of the CE2 relay 1214, conductor 1215, thence through the checking circuit of the B, C, D, E and F orders of the reading relays, conductor 806, back contact and armature 3 of the AL relay 600, conductor 602, armature 5 and front contact of the RCD relay 414, conductor 417 and thence through the back contact and armature of the RKA relay 705 to the G1 contact or alternatively the front contact and armature of the RKB relay 706 to the G2 contact. In this manner the MG1 relay 1005 will operate and certify that the first code read in the tape identity codes is properly a marker group code and additionally that there is a valid digit representation in each of the denominational orders thereof. Upon the operation of the MG1 relay a circuit is established from ground, armature 3 and front contact of the LK1 relay 702, back contact and armature of the APB relay 1211, conductor 1212, the normal contacts of the armature 1 of the MG2 relay, armature 3 and front contact of the MG1 relay for locking this relay closed as long as the LK1 relay remains operated. This LK1 relay in the present instance operates during the closure of the H5 contact but releases thereafter. Therefore, the MG1 and MG2 relays release as soon as the H5 contact opens its circuit. It may be noted that later on in the operation, the LK1 relay may be locked in to more or less permanent operation by the LK2 relay 703 but since this operation is not of particular interest in connection with the present invention it will not be further described.

We will now assume that the tape identity in the other codes for the month, the recorder, the hour and the day of month check properly and that the assembler goes about its business in proper order.

*Splice patterns*

It has been mentioned hereinbefore that there are two main kinds of splices over which the reader must pass and for which arrangements have been made to cause an automatic skipping operation. The first is the ordinary splice wherein two tape ends are spliced together over the splice code pattern. Such a splice may occur at a good number of points within a tape. For instance, the ten output tapes of the assembler must be spliced together to form a single input tape for a second sort operation in the assembler or for an operation in the next accounting device, the computer. Therefore, all incoming tapes used in the assembler at least on the second sort operation will have nine of these splices in the tape. In addition, any one of the sections of tape from which the second sort incoming tape is made may have a window splice included therein such as that illustrated in Fig. 1. This comes from the fact that the blank tapes being fed into the ten recorders may have to be lengthened during the operation of the assembler on a first sort operation. Therefore, a second sort tape will have at least nine ordinary splices and may have one or more window splices therein.

It is to be noted that the tape used in the assembler for the first sort operation will never have a window splice therein. For this tape is that known as the central office tape which is produced by the recorders in the central office. When a tape becomes short in the central office recorder since this recorder must be ready for continuous and instant operation, no time is afforded for the making of a window splice. Therefore, when a tape in a recorder becomes short, this recorder is shut down and an emergency recorder switched into operation. Thereafter, the short end is prepared as a trailing end of a tape so that the central office tape coming to the assembler may have therein an ordinary splice.

We will now assume that during the course of the operation of the assembler a 286000 code is encountered. This is a signal that an ordinary splice will follow. The 286000 code will, therefore, operate the SKP relay 500. A ground from the G1 reader contact through the armature and back contact of the RKA relay 705 or from the G2 reader contact through the armature and front contact of the RKB relay 706 will be extended over conductor 417, the front contact and armature 5 of the RCD relay 414, conductor 602, armature 3 and back contact of the AL relay 600, conductor 806, through the up-check circuit of the B, C, D, E and F digits to conductor 1215, thence over the back contact and armature of the CE2 relay 1214, conductor 704, back contact and armature of the LK2 relay 703, conductor 805, armature 1 and back contact of the A0 relay 800, the front contact and armature 2 of the A2 relay 802, the back contact and armature 2 of the A1 relay 801 (expressing the A digit 2), the armature and front contact of the B1 relay, the armature and front contact of the B7 relay (expressing the B digit 8), conductor 808, the back contact and armature 1 of the ME relay 1117, the back contact and armature of the AP0 relay 1213, conductor 804, armature and front contact of the C2 relay, armature and front contact of the C4 relay (expressing the C digit value 6), conductor 809 through the armature 1 and front contact of the FSA relay 1003, conductor 1008 to the winding of the SKP relay 500 and thence to battery and ground.

The operation of the A2 relay 802 will operate the LK1 relay 702 in the manner hereinbefore described. With the LK1 and SKP relays operated the SK1 relay 502 will operate in a circuit from ground, armature 3 and front contact of the LK1 relay 702, conductor 707, front contact and armature 2 of the SKP relay 500 to the winding of the SK1 relay 502. The SK1 relay now locks over its armature 4 and front contact directly to the ground on conductor 707 independently of the connection extended through the SKP relay 500. With the SK1 relay operated a circuit is closed for the RS2 and RS4 relays which may be traced from ground, armature 3 and front contact of the MON relay 1200, conductor 1216, armature 5 and back contact of the SK2 relay 503, armature 1 and front contact of the SK1 relay 502, armature 1 and front contact of the SKP relay 500, back contact and armature 2 of the ETB relay 504, conductor 505, and thence in parallel through the windings of the RS2 relay 708 and the RS4 relay 701. Thus, the reader step relays will operate and open the circuit for the step magnet 406 whereby the reader is impelled to step off the 286000 code.

The next entry and a large number thereafter will be the 081010 code. Upon the first occurrence of this code and the operation of the reading relays in accordance therewith a circuit will be established from either the G1 or the G2 contact in the manner hereinbefore described to conductor 417, thence over the front contact and armature 5 of the RCD relay, conductor 602, armature 3 and back contact of the AL relay 600, conductor 806, thence through the two-out-of-five check circuits for the B, C, D, E and F digits to prove that each of these sets of reading relays is operated in accordance with a legitimate digit conductor 1215, the back contact and armature of the CE2 relay 1214, armature 2 and back contact of the CE3 relay 1217, the armature 2 and front contact of the A0 relay 800, the back contact and armature 1 of the A2 relay 802, the back contact and armature 1 of the A01 relay 801 (thus checking digit zero in the A relays), the back contact and armature 1 of the CE3 relay 1217, conductor 1218, armature 2 and front contact of the FSA relay 1003, conductor 1009 armature 3 and front contact of the A0 relay 800 (expressing the A digit zero), through an armature and front contact of the B1 relay, armature and front contact of the B7 relay (expressing the B digit 8), conductor 810, armature 2 and back contact of the ME relay 1117, the armature and back contact of the LN4 relay 708, the armature and back contact of the LN2 relay 709, conductor 710, armature 3 and front contact of the C0 relay, armature and front contact of the C1 relay (expressing the C digit 1), armature and front contact of the D4 relay, armature and front contact of the D7 relay (expressing the D digit zero), armature and front contact of the E0 relay, armature and front contact of the E1 relay (expressing the E digit 1), armature and front contact of the F4 relay, armature and front contact of the F7 relay (expressing the digit zero), conductor 900, the back contact and armature 6 of the SK1 relay 502, the back contact and armature 8 of the SK2 relay 503 and thence through the winding of the SKS relay 506. The SKS relay 506 operates in this circuit and locks directly to the ground on conductor 900 thus by-passing the circuit through the armatures and contacts of the SK1 relay 502 and the SK2 relay 503. The operation of SKS relay 506 closes a circuit from ground, armature 3 and front contact of the SKS relay 506 to the winding of the SKP relay 500. Thereupon a circuit is closed from ground, armature 1 and front contact of the SKS relay 506, through the front contact and armature 3 of the SKP relay 500, thence to the winding of the SK2 relay 503. The SK2 relay locks in a circuit from ground, armature 7 and front contact of the ST3 relay 1206, conductor 1219 through the normal contacts controlled by armature 1 of the ESK relay 507, the armature 4 and front contact of the SK2 relay 503. A parallel locking circuit may also be traced over conductor 517 through the back contact and armature 1 of the SKW relay 501, conductor 516 and in parallel therewith from conductor 517 through the back contact and armature of the TIC relay 1016, the back contact and armature 2 of the RECA relay 1017, the back contact and armature of the LIA relay 1010 to conductor 516 and thence over the back contact and armature of the HR1 relay 1013, the FR1 relay 1014, the MO1 relay 1015, the MG1 relay 1005 to the conductor 1219 leading as above stated through the front contact and armature 7 of the ST3 relay 1206 to ground. It may also be noted that when the RECA relay 1017 is operated (an operation set forth hereinafter), one of these branches of the SK2 locking circuit will be opened but another will be closed thereby which may be traced from conductor 517 through armature 1 and back contact of the SKW relay 501, armature 2 and front contact of the RECA relay to conductor 1219 leading to the ground supplied by the start relay.

The operation of the SK2 relay closes an obvious circuit through its front contact and armature 7 for operating the SK3 relay 508. The operation of the SKP relay 500 also closes a circuit from the ground on conductor 707, through the front contact and armature 2 of the SKP relay 500 to the winding of the SK1 relay 502. Now with the SK1 and SK2 relays operated a circuit is completed from ground, armature 5 and front contact of the LK1 relay 702, conductor 711, armature 6 and front contact of the SK2 relay 503, armature 4 and front contact of the SK1 relay 502, conductor 510 to the winding of the LLA relay 712 whereupon this relay becomes operated and at its armature 3 and back contact opens the locking circuit for the LK1 relay 702, so that this relay releases at the end of the cycle. The SK2 relay 503 operated also operates the RS2 relay 708 and the RS4 relay 701 over a circuit from the H0 reader contact, conductor 418, the normally closed contacts of armature 3 of the ESK relay 507, the armature 2 and front contact of the SK2 relay 503, the armature 2 and back contact of the SKW relay 501, conductor 511, the back contact and armature 4 of the AL relay 600, conductor 603, the armature 1 and back contact of the LIA relay 1010, the back contact and armature 2 of the MG1 relay 1005, conductor 505 to the windings of the RS4 relay 701 and the RS2 relay 708 in parallel. Thus the reader steps off the first entry with the LK1 relay 702 and the SK1 relay 502 releasing at the end of the pulse. The SK2 relay operated also removes ground from the reader step relay contacts which recycles the short timer.

This operation may be explained in this manner, that up to the operation of the SK3 relay a ground was extended over the back contact and armature 3 of the SK3 relay, conductor 512, to the armature 4 of the RS4 relay 701 from whence it is extended to conductor 1220 leading to the junction between the condensers 604 and the upper winding of the TM relay 605. It may be explained that a ground on conductor 1220 will hold the armature of the TM relay 605 in the position shown so as to keep ground supplied over conductor 1216 from being connected to the

17

AL relay 600. If the ground is removed from conductor 1220 then nevertheless current will flow through the upper winding of the TM relay 605 to charge the condensers 604. The size and arrangement of these condensers, however, is such that the ground on conductor 1220 may be removed for a time equal to about seven reader steps without causing the operation of the alarm relay 600. The reader step relay will normally operate repeatedly once for advancing the incoming tape over each code encountered and under all normal operations this will occur in the neighborhood of sixteen times each second. Therefore, the operation of the RS4 relay will place a series of pulses on the conductor 1220 each of which will discharge the condensers 604 so that they are in condition to hold the timing relay 605 operated for the required length of time.

In the present case the SK3 relay 508 has operated and has removed the ground from the conductor 512. This conductor, however, has now been extended at the end of this cycle through the release of the SK1 relay over the armature 2 and back contact of the SK1 relay 502, conductor 513, the armature 4 and front contact of the A0 relay 800, conductor 810 to the ground supplied by the H2 reader cam contact. Therefore, during the following interval in which the RS4 relay is continuously operated a ground will be supplied periodically to the conductor 1220 by the H2 contact through the repeated operation of the A0 relay to continually recycle the timing relay 605. Thus for skipping a long section of splice pattern, conditions are established as follows. The SK2 relay 503 and the SK3 relay 508 are operated. The RS2 relay 708 and the RS4 relay 701 are operated from the H0 reader contact and the short timer is recycled by these RS relays plus the A0 relay 800. When skipping a normal splice, not more than one or two A0 holes in succession will be blocked so that a normal splice will be passed.

If, however, for any reason an excessive number of A0 holes cannot be read the short timer will not be recycled and an alarm will be brought in after above seven lines. The alarm relay 600 operated opens the lead to the reader step relays to hold the stepping and when the reader lamp key is operated the skip lamp 606 lights under control of the ESK relay 507 and the SK3 relay 508.

For normal operation skipping will continue under control of the continuous operation of the reader step relays until a 284XXX marker group entry is encountered. In this case, the MG1 relay 1005 will operate in the manner hereinbefore set forth to open the path of the reader step relays and in addition the end of skipping ESK relay 507 is operated from the A2 relay 802. A circuit for this operation may be traced from armature 5 and front contact of the A2 relay 802, conductor 811, front contact and armature 1 of the SK2 relay 503, winding of the ESK relay 507 to battery whereupon the ESK relay will operate and lock to the ground on conductor 811 independently of the contact controlled by the SK2 relay. In addition, one or more contacts of the E and F digits will place a ground on conductor 811 (unless the marker group happens to be 10). The ESK relay 507 also opens the path to the reader step relays and releases the SK2 relay 503 providing the MG1 relay 1005 is operated. Probably the ESK relay 507 and the MG1 relay 1005 will operate together but in any case a preliminary make contact is closed by the ar-

18 mature 1 of the ESK relay 507 so that this relay locks before releasing the SK2 relay which in turn opens the original operating path of the ESK relay.

The ESK relay 507 holds until the end of the cycle whereupon all relays are restored to normal. If the marker group entry was missing or unrecognizable due to a tape trouble or trouble condition the reader will proceed to step until an entry is encountered which will operate the ESK relay 507. If the ESK relay cannot operate due to a trouble condition an additional path is provided to operate the alarm relay AL directly over a path from ground, armature 4 and front contact of the A1 relay 801, conductor 812, armature 3 and front contact of the SK2 relay 503, conductor 514, winding of the AL relay 600 to battery and ground. The alarm relay 600 locks through its front contact and armature 5 to the ground on conductor 1216 provided at the front contact of armature 2 of the master off-normal relay 1200. An alarm cut-off relay 608 is provided for opening this locking circuit to release the alarm relay when the trouble has been located. The B0, B2 and B4 relays also place a ground on conductor 812 so that if there is any deviation from the digit 8 now supposed to be registered in these reader relays the same circuit action will take place to release the reader step relays through the operation of the alarm relay 600.

Start skipping

When a tape is inserted into the reader the tape is advanced manually to the point where a good splice pattern is encountered. When the start key is operated a path through the two-out-of-five check circuit through the contacts of the A0 relay 800 operated, the A1 relay 801 and A2 relay 802 released, the back contacts of the ME relay 1117, the LN2 relay 707, the LN4 relay 708 and a 081010 path through the appropriate reading relays in the manner hereinbefore set forth is closed to operate the SKS relay 506 in turn operating the SK2 relay 503. The SKS relay 506 locks for the remainder of the cycle, the original operating path being opened by the SK2 relay 503 in the manner hereinbefore set forth. The SK2 proceeds to permit stepping as previously covered, the MG1 relay 1005 releasing the SK2 relay and operating the ESK relay 507 as before.

Through the use of the timing relay 605 an actual splice may be skipped wherein no one of the reading relays is operated for several cycles. If the consequent removal of ground pulses from the conductor 1220 is prolonged, however, the TM relay will operate its armature toward the right and close a circuit for the alarm relay 600 with the consequences hereinbefore set forth.

Second sort

On the second sort the sort switches within the rectangle 1002 are operated to their next contact so that the conductor 1210 will now be connected to the second sort SSA relay 1010 instead of the first sort relay 1003. In this case, when the 2860XX code is encountered the ground on conductor 809 instead of being extended through the armature 1 and front contact of the FSA relay 1003 to the SKP relay 500 is now extended through armature 2 and front contact of the SSA relay 1010, conductor 1011 to the winding of the ETA relay 515. The ground on conductor 707 from the LK1 relay 702 operated on the code beginning with the digit 2 in the A place is now extended through the front contact and armature of the ETA relay 515 to operate the ETB relay 504 which locks directly to the ground on conductor 707. In this case, the ET relays are employed to perform an additional function with which we are not immediately concerned. This will hold up the operation of the SKP relay 500 until the 286 code has been spread on each of the outgoing perforator tapes after which the reader is advanced to the first of the splice pattern codes and the operations become the same as hereinbefore.

*Window splice*

In the second sorting operation the signal 287020 on the input tape indicates to the assembler circuit that a splice in the tape is approaching and that it will be covered by splice pattern 081010. A ground from the G1 or G2 reader contact comes through an input checking circuit hereinbefore set forth through the 287 path completed by the reading relays (this time the conductor 804 instead of being extended through the contacts of the C2 and C4 relays to the conductor 809 is now extended through the front contact and armature 4 of the C0 relay, the armature 3 and front contact of the C7 relay to conductor 813), over conductor 813, armature 3 and front contact of the SSA relay 1010, conductor 1012, winding of the SKW relay 501 to battery. The SKW relay operates and due to the 287 code the LK1 relay 702 will be operated. With both the LK1 and SKW relays operated the SK1 relay operates from a ground on conductor 707, through the front contact and armature 5 of the SKW relay 501 to the winding of the SK1 relay 502. The SK1 relay operates and locks to the ground on conductor 707. The RS2 and RS4 relays now operate in the manner hereinbefore described and the reader steps to the next line during the following open period. The next line will be 081010 and relay A0 will operate causing the SK2 relay 503 to operate over conductor 513 from the H2 contact. The SK2 relay 503 locks in the manner hereinbefore described. The RS2 and RS4 relays are now operated on each line until skipping is halted. It may be noted that these reader step relays are held in a locking circuit through the front contact and armature 2 of the RS4 relay 701 extended over conductor 713 to the H3 contact whereby these relays will be held alternately by the H0 and H3 contacts.

The same safeguards on skipping splice pattern are employed here as on skipping regular splice pattern in the first sort. If the A0 digit is unreadable for more than approximately seven lines the short timer stops the circuit as previously described. An A2 or other than 10 in the E and F digits will operate the ESK relay 507 to release the reader step relays. An A1 or other than 8 in the B digit will operate the alarm relay directly.

When the 287 code at the end of the splice is encountered the SKW relay 501 reoperates opening the H0 skipping path and operates the SK1 relay 502 from the LK1 relay 702 which has also operated at this time. The ESK relay 507 also operates. Two grounds are provided by the 287020 signal, ground from the A2 relay and the E2 relay simultaneously applied to conductor 811 to operate the ESK relay 507.

It may also be noted that when the 287 code is encountered and ground is extended over the conductor 813, a circuit is also established from armature 4 and front contact of the SSA relay 1010, thence through the armature 3 and back contact of the RECA relay 1017, the armature 2 and back contact of the TIC relay 1016 to the winding of the RECA relay 1017. This relay now locks in a circuit from its winding, its armature 4 and front contact, conductor 1018, the back contact and armature 4 of the SKP relay 500 to the ground on conductor 1216 coming from the front contact and armature 3 of the MON relay 1200. This circuit is not effective during the time the splice code is being skipped since the operation of the SKP relay 500 opens the locking circuit of the RECA relay 1017. However, upon the second occurrence of the 287020 code at the end of the skipping operation the RECA relay is operated and locked. The RECA relay 1017 operated shunts the circuit including the armature and back contact of the MG1 relay 1005, the M01 relay 1015, the FR1 relay 1014 and the HR1 relay 1013 so an entry other than the 287 code will not release the SK2 relay. In such a case when a call entry is encountered the alarm will be brought in and the skip lamp 606 will be operated.

Under normal conditions, however, the 287 code will cause the release of the SK2 relay in the normal manner so that the normal operations of the assembler may be carried out.

Thus, it will be seen that safeguards are provided when the reader step relays are placed in an automatic circuit so that the reader will not be allowed to overrun legitimate codes but will definitely be stopped either by a definite legitimate code or a deviation from the splice code 081010, be it either a legitimate code or an erroneous operation which would bring in the alarm.

What is claimed is:

1. In an automatic accounting system wherein electrically operated accounting devices are employed to assemble, sort, translate, compute and otherwise rearrange items of information perforated in code on a tape, and wherein each said accounting device operates from an incoming tape to produce a plurality of outgoing tapes, each said accounting device having a reader for reading the codes from an incoming tape and a circuit into which a code read may be entered, and wherein each said tape has each end thereof prepared for splicing by the perforation therein of a plurality of distinctive (splice pattern) codes, means in the circuit of any one of said devices for skipping, by automatic continuous repetitive operation, over a splice in an incoming tape or the said prepared ends thereof, a double check means for stopping said automatic skipping operation consisting of (1) a circuit means responsive to a valid code other than a said splice pattern code and (2) a circuit means responsive to an invalid code deviating from said splice pattern code and means responsive to said last means for bringing in an alarm.

2. In an automatic accounting system wherein electrically operating accounting devices are employed to assemble, sort, translate, compute and otherwise rearrange items of information perforated in code on a tape, and wherein each said accounting device operates from an incoming tape to produce a plurality of outgoing tapes, each said accounting device having a reader for reading the codes from an incoming tape and a circuit into which a code read may be entered, and wherein each said tape has each end thereof prepared for splicing by the perforation therein of a plurality of distinctive (splice pattern) codes, each said code being in the form of a plurality of digits, means in the circuit of any one of said devices for skipping, by automatic continuous repetitive operation, over a splice in an incoming tape of the said prepared ends thereof, a double check means for stopping said automatic skipping operation consisting of (1) a circuit means responsive to a valid code other than a said splice pattern code and (2) a circuit means responsive to an invalid code deviating in its first code digit from said splice pattern code and means responsive to said last means for bringing in an alarm.

3. In an automatic accounting system wherein electrically operated accounting devices are employed to assemble, sort, translate, compute and otherwise rearrange items of information perforated in code on a tape, and wherein each said accounting device operates from an incoming tape to produce a plurality of outgoing tapes, each said accounting device having a reader for reading the codes from an incoming tape and a circuit into which a code read may be entered, and wherein each said tape has each end thereof prepared for splicing by the perforation therein of a plurality of distinctive (splice pattern) codes, each said code being in the form of a plurality of digits, means in the circuit of any one of said devices for skipping, by automatic continuous repetitive operation, over a splice in an incoming tape or the said prepared ends thereof, a double check means for stopping said automatic skipping operation consisting of (1) a circuit means responsive to a valid code other than a said splice pattern code and (2) a circuit means responsive to an invalid code deviating in its first code digit from said splice pattern code, alarm means, means under control of said invalid code responsive means for operating said alarm and means responsive to the simultaneous operation of (1) said valid code responsive means and (2) said invalid code responsive means for preventing the operation of said alarm.

4. In an automatic accounting system wherein electrically operated accounting devices are employed to assemble, sort, translate, compute and otherwise rearrange items of information perforated in code on a tape, and wherein each said accounting device operates from an incoming tape to produce a plurality of outgoing tapes, each said accounting device having a reader for reading the codes from an incoming tape and a circuit into which a code read may be entered, and wherein each said tape has each end thereof prepared for splicing by the perforation therein of a plurality of distinctive (splice pattern) codes, a reader step relay for controlling the advance of an incoming tape, said relay being responsive to (1) the completion of the reading of a code by said reader and (2) a satisfaction signal produced in the circuit of a said reader, means in the circuit of any one of said devices responsive to the reading of (1) a blank code (no perforations), (2) a splice pattern code, or (3) a mutilated splice pattern code, for producing a satisfaction signal to continue the operation of said reader step relay, an alarm means, means responsive to a code deviating from a said splice pattern code for operating said alarm means and means responsive to a valid code deviating from a said splice pattern code for preventing the operation of said alarm means and for producing a satisfaction signal to cause the continued operation of said reader step relay.

JOHN W. GOODERHAM.

REFERENCES CITED

The following references are of record in the file of this patent:

UNITED STATES PATENTS

| Number | Name | Date |
| --- | --- | --- |
| 1,863,479 | Hoover et al. | June 14, 1932 |
| 2,017,087 | Ackell et al. | Oct. 15, 1935 |
| 2,375,293 | Doty | May 8, 1945 |
| 2,379,865 | Connery et al. | July 10, 1945 |